(No Model.) 2 Sheets—Sheet 1.
G. H. POOR.
VALVE FOR FLUID PRESSURE BRAKES.
No. 396,171. Patented Jan. 15, 1889.
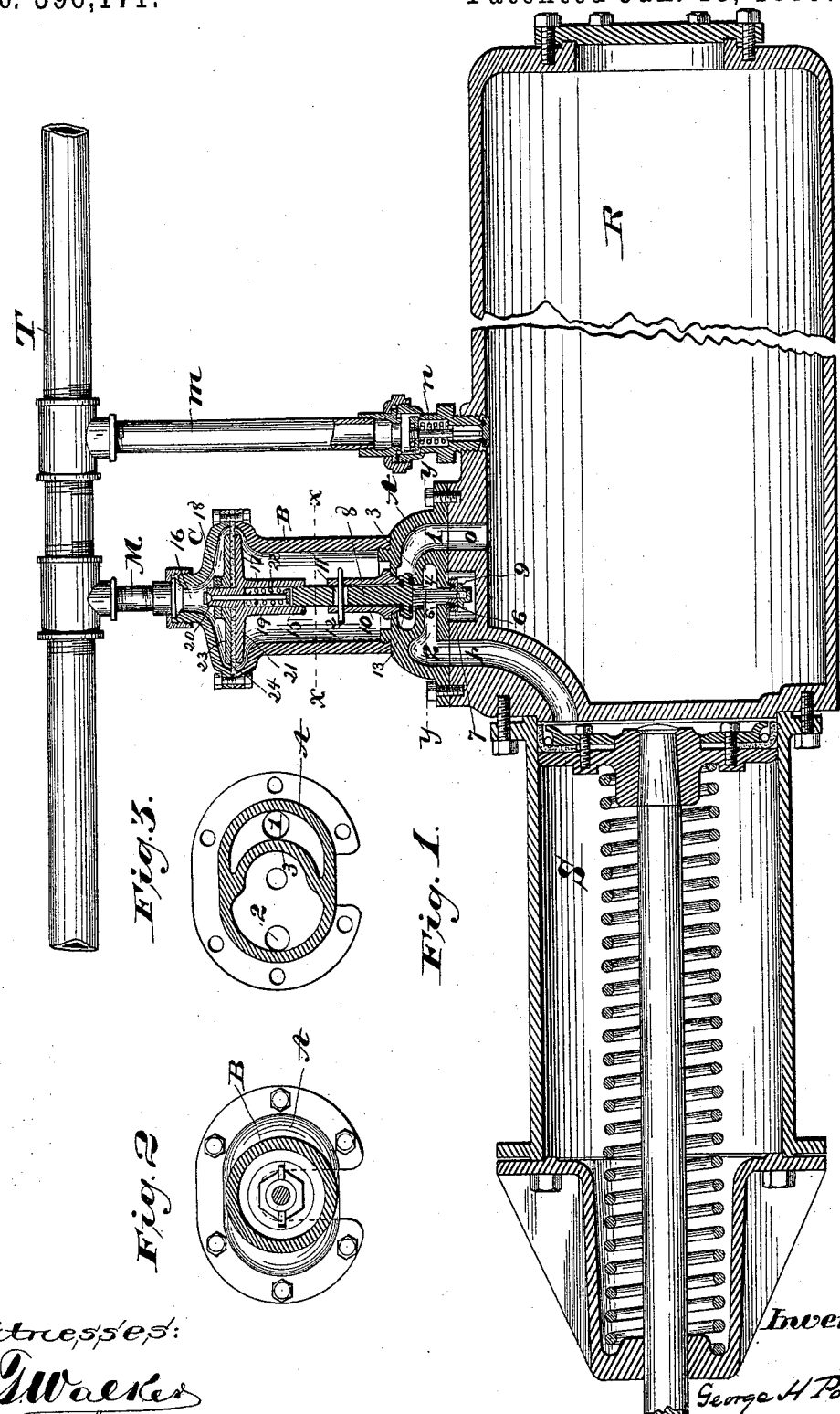
Witnesses:
E. J. Walker
Edwin S. Clarkson
Inventor:
George H. Poor
by F. W. Ritter Jr
atty

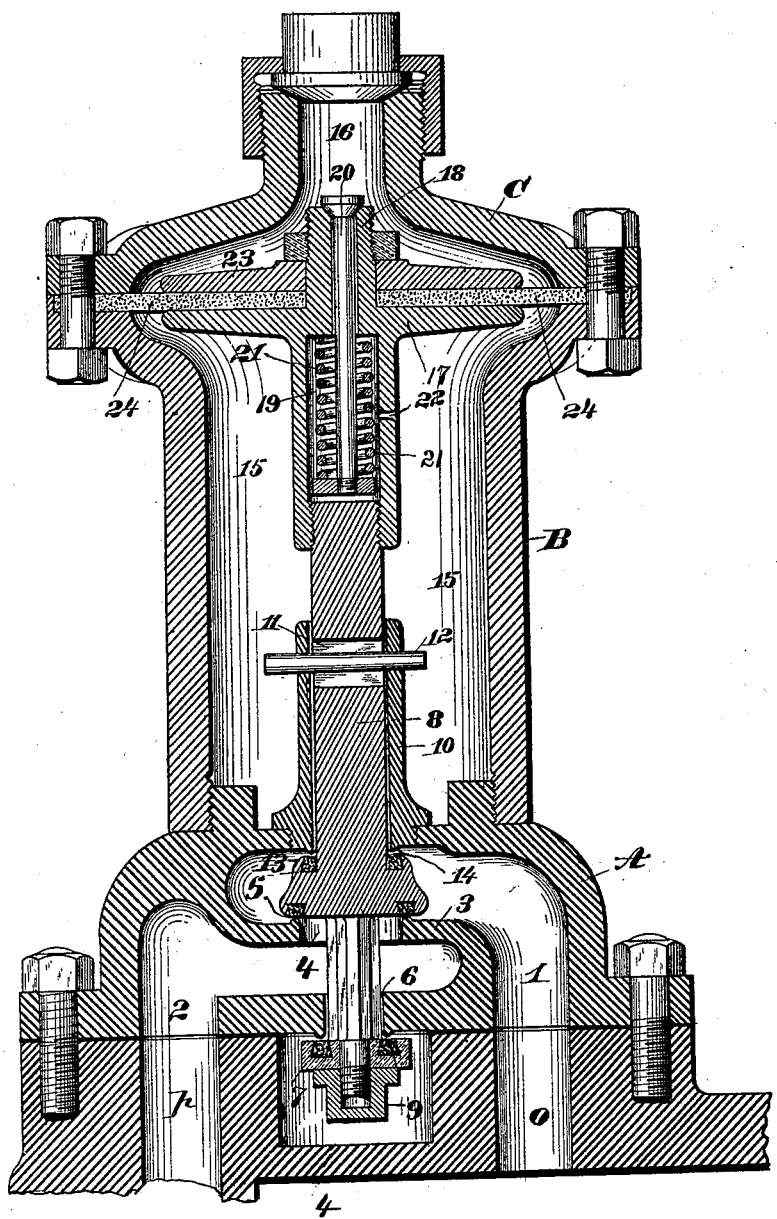

UNITED STATES PATENT OFFICE.

GEORGE H. POOR, OF ST. LOUIS, MISSOURI, ASSIGNOR TO THE AMERICAN BRAKE COMPANY, OF SAME PLACE.

VALVE FOR FLUID-PRESSURE BRAKES.

SPECIFICATION forming part of Letters Patent No. 396,171, dated January 15, 1889.

Application filed August 21, 1888. Serial No. 283,330. (No model.)

*To all whom it may concern:*

Be it known that I, GEORGE H. POOR, a citizen of the United States, residing at St. Louis, in the State of Missouri, have invented certain new and useful Improvements in Valves for Fluid-Pressure Brakes; and I hereby declare the following to be a full, clear, and exact description of the same, reference being had to the accompanying drawings, wherein—

Figure 1 is a sectional view of a valve embodying my invention, an auxiliary reservoir and cylinder, and an elevation of a portion of the train-pipe and branch pipe leading to the auxiliary reservoir, showing the arrangement of my valve with relation to the other devices of the system. Fig. 2 is a section of the valve on the line $x\,x$, Fig. 1. Fig. 3 is a section on the line $y\,y$, Fig. 1. Fig. 4 is an enlarged central section of the valve, the same as shown in Fig. 1.

Like letters and figures refer to like parts wherever they occur.

My present invention relates to the construction and manner of operating air-valves for fluid-pressure brakes, and has for its object to produce a simple and efficient valve to be operated directly from the train-pipe by slight variations of pressure in said train-pipe; and it consists, mainly, in combining with the valve a diaphragm or impulse chamber, said chamber adapted to be charged through the auxiliary reservoir, and having a reducing-valve or like means whereby the pressure in said diaphragm-chamber may be maintained at a given pressure above that of the train-pipe, so as to definitely graduate the increase of pressure in the train-pipe which is required at any time to release the brakes.

There are minor features of invention embraced in the particular construction of the devices, all of which will hereinafter more fully appear.

I will now proceed to describe the invention more specifically, so that others skilled in the art to which it appertains may apply the same.

In the drawings, T indicates the train-pipe; M, a branch leading therefrom to the diaphragm-chamber or impulse-chamber; $m$, the branch leading to the auxiliary reservoir, and through which the reservoir is charged, said branch being provided with a suitable check-valve, $n$, opening toward the reservoir; R, the auxiliary reservoir; $o$, the passage leading from the reservoir to the valve; $p$, the passage leading from the valve to the cylinder, and S the cylinder provided with its customary piston and piston-rod, all of which may be of any desired or well-known character.

The valve has a shell composed of several sections, one of which, A, is provided with a port or passage, 1, for communication with the auxiliary reservoir R, and a port or passage, 2, for communication with the cylinder S, said ports being separated by the partition 3, in which is the valve-port 4, having a suitable seat for a valve, which controls said port 4. In the wall of the shell-section A and in line with valve-port 4 is the exhaust-port 6, for which a suitable valve, 7, is provided.

The valves 5 and 7 are so secured to one and the same stem, 8, that a limited movement of the stem will seat one and unseat the other, and, if desired, the valve 5 may be formed with the stem and the valve 7 secured adjustably by a nut, 9, both valves being faced in any manner well known to those skilled in the art.

The valve-stem 8 projects through a hollow post, 10, secured to the section A of the shell and projecting into section B of the shell, the stem 8 having an elongated slot, 11, through which, and also through the post 10, passes a pin, 12, to prevent the rotation of the stem.

The stem 8 need not be more than an ordinary workmanlike fit in the hollow post 10, as the leak will permit the diaphragm-chamber to fill from the auxiliary reservoir and to equalize with the reservoir when the brakes are off and the valve 5 in the position shown in the drawings; but as it may be desirable to prevent any leakage from the diaphragm-chamber when the brakes are applied the valve 5 is preferably made a double-seated valve, as shown at 13, and a seat, 14, is formed on the under side of hollow post 10.

B indicates a second shell-section adapted to inclose the hollow post 10 and form with cap C a diaphragm or impulse chamber, 15, the cap C having a port, 16, by which it communicates with the train-pipe.

17 indicates a disk having a hollow threaded stub, 18, and a hollow stem, 19, within which is a check-valve, 20, that opens away from the diaphragm or impulse chamber 15 and toward the train-pipe 10. This check-valve 20 is weighted by a spring, 21, of any desired force, which converts it into a reducing-valve, which can be graduated so as to maintain the pressure in the impulse-chamber 15 at any degree above that in the train-pipe, so that such increase of pressure in the train-pipe will release the brakes. If, therefore, the power of spring 21 be one pound, the reduction-valve will maintain the pressure in impulse-chamber 15 that much above the pressure in the train-pipe, and an increase of one pound pressure in the train-pipe will seat the valve 5 on the port 4 and unseat the exhaust-valve 7, releasing the brakes.

22 indicates a port in the hollow stem 19 for establishing the communication between reducing-valve 20 and the impulse-chamber 15.

23 is an annular disk, between which and the disk 17 the diaphragm 24 is clamped, said diaphragm being also clamped between the shell-section B and the cap C, and the stem 19 is connected with stem 8, so that the diaphragm 24 directly controls valves 5 and 7.

The devices, being constructed substantially as hereinbefore specified, will operate as follows: The system being charged with air at the desired pressure, the air will pass to the reservoir directly by branch m and through passages o i, and the leak through post 10 around stem 8 will charge the diaphragm or impulse chamber 15. If, now, the pressure be slightly reduced in the train-pipe T, the expansion of the air in impulse-chamber 15 will impart an impulse to diaphragm 24, which will lift valve 5, unclosing port 4, and at the same time seat valve 7, closing exhaust-port 6, and thus establish a direct communication between auxiliary reservoir R and cylinder S through passages 1 and 2 and port 4. This lifting of the valve 5 will also bring its upper face on valve-seat 14, which encircles the stem, and prevent any leakage from the diaphragm or impulse chamber 15. If the pressure in train-pipe T is further reduced, the reduction-valve 20 will open and allow the air to escape from the impulse-chamber into the train-pipe until the difference of pressure is only equivalent to the force of spring 21, when the reduction-valve will close, and when the pressure is subsequently raised in the train-pipe to release the brakes an increase of even less than the power of spring 21 will, on account of difference in area, impart a reverse impulse to diaphragm 24, thus forcing valve 5 again on its seat, closing port 4, and forcing valve 7 off its seat, opening the exhaust-port 6, thus releasing the brakes.

For purposes of convenience I have illustrated the invention as applied by means of a diaphragm and the reduction-valve as arranged in a hollow stem passing through the diaphragm; but it will be evident to any skilled mechanic that a piston can be substituted for the diaphragm and that the reduction-valve can be placed in a passage leading around instead of through the diaphragm, which will be equivalents for the construction shown and embraced by the claims hereinafter made.

Having thus described the nature, advantages, and operation of my invention, what I claim, and desire to secure by Letters Patent, is—

1. In a valve for fluid-pressure brakes, the combination, with the inlet and exhaust valves, of an impulse-chamber which communicates with the auxiliary reservoir, a diaphragm which is arranged in the impulse-chamber and connected with the valves, and a reduction-valve arranged in a passage leading from the impulse-chamber to the train-pipe, substantially as and for the purposes specified.

2. In a valve for fluid-pressure brakes, the combination of the inlet and exhaust valves having a stem common to both, an impulse-chamber which communicates with the auxiliary reservoir, a diaphragm arranged in the impulse-chamber, and a reduction-valve interposed between the impulse-chamber and the train-pipe, substantially as and for the purposes specified.

3. In a valve for fluid-pressure brakes, the combination of an exhaust-valve, a double-seated inlet-valve, an impulse-chamber, a leak leading from the impulse-chamber to the reservoir, said leak arranged to be closed by one face of the double valve, and a reduction-valve interposed between the impulse-chamber and the train-pipe, substantially as and for the purposes specified.

4. In a valve for fluid-pressure brakes, the combination of shell-section A, having passages 1 and 2 and ports 4 and 6, valves 5 and 7, connected by stem 8, hollow post 10, impulse-chamber 15, a diaphragm having a hollow stem, and a reduction-valve arranged in the hollow stem of the diaphragm, substantially as and for the purposes specified.

In testimony whereof I affix my signature, in presence of two witnesses, this 26th day of July, 1888.

GEORGE H. POOR.

Witnesses:
JNO. R. WILLIAMS,
JOHN C. H. STEVENSON.